Patented Nov. 24, 1925.

1,562,459

UNITED STATES PATENT OFFICE.

JOSIAH K. LILLY, OF INDIANAPOLIS, INDIANA, ASSIGNOR TO ELI LILLY AND COMPANY, OF INDIANAPOLIS, INDIANA, A CORPORATION OF INDIANA.

MEDICINAL PREPARATION.

No Drawing. Application filed March 5, 1925. Serial No. 13,366.

*To all whom it may concern:*

Be it known that I, JOSIAH K. LILLY, a citizen of the United States, residing at Indianapolis, in the county of Marion and State of Indiana, have invented a new and useful Medicinal Preparation, of which the following is a specification.

It is the object of my invention to decrease the tendency to produce iodism in the use of the hydriodid of phenylcinchoninic acid, and to make that product more available in acute and subacute cases of arthritis by increasing the analgesic effect.

The hydriodid of phenylcinchoninic acid (2-phenyl quinolin 4-carboxylic acid hydriodid), described in Patent No. 1,306,439, granted June 10, 1919, to H. W. Rhodehamel, is very widely and effectively used in the treatment of arthritis. It has been mainly applicable, however, in cases of chronic arthritis, where there was not a great deal of pain, and where the disease was of fairly long standing. It is found, however, that with many individuals this compound tends to produce iodism; so that with those individuals its use must be interrupted at times on that account. Moreover, it is found that the relief from this product alone is often insufficient in acute and subacute cases of arthritis, because the pain is not sufficiently relieved in those cases.

I have discovered that I can largely overcome these difficulties by modifying the action of the hydriodid of phenylcinchoninic acid with straight phenylcinchoninic acid. That is, by mixing phenylcinchoninic acid with the hydriodid of phenylcinchoninic acid, I find that I can largely avoid such difficulties as arise from the use of the hydriodid alone, and at the same time obtain an increased analgesic action which makes the composite product a material advance, especially in the treatment of acute and subacute cases of arthritis. The composite product of the phenylcinchoninic acid with the hydriodid of phenylcinchoninic acid is found to exert a greater analgesic action than does the hydriodid alone, so that with comparable doses the composite product produces greater and more prompt relief of pain. Further, the composite product can be administered with considerably less likelihood of producing iodism, so that in many cases which when treated with the hydriodid alone required intermissions in the treatment to prevent iodism it is possible to use the composite product without intermission.

The phenylcinchoninic acid and the hydriodid thereof may be mixed in various proportions; but I find that excellent results are obtained by mixing them in equal proportions by weight. This mixture or composite product may be put up in tablets or capsules, of the desired size, and administered orally. The composite product apparently is of equal benefit with the hydriodid alone in the treatment of chronic arthritis, with much less danger of producing iodism; and is of greater benefit in the treatment of acute and subacute cases of arthritis.

I claim as my invention:—

1. A medicinal preparation comprising a mixture of phenylcinchoninic acid with the hydriodid of phenylcinchoninic acid in substantially equal proportions by weight.

2. A medicinal preparation comprising a mixture of phenylcinchoninic acid with the hydriodid of phenylcinchoninic acid.

In witness whereof, I have hereunto set my hand at Indianapolis, Indiana, this 2nd day of March, A. D. one thousand nine hundred and twenty-five.

JOSIAH K. LILLY.